United States Patent [19]

Knight

[11] Patent Number: 4,906,881
[45] Date of Patent: Mar. 6, 1990

[54] NUTATING MOTOR WITH AUTOMATIC ENGAGEMENT AND DISENGAGEMENT OF HAND WHEEL WITH OUTPUT SHAFT

[75] Inventor: Richard K. Knight, Redondo Beach, Calif.

[73] Assignee: Eaton Corporation, Cleveland, Ohio

[21] Appl. No.: 316,752

[22] Filed: Feb. 28, 1989

[51] Int. Cl.⁴ .................................................. H02K 7/06
[52] U.S. Cl. ......................................... 310/82; 310/83; 310/49 R
[58] Field of Search .................... 310/80, 82, 83, 49 R

[56] References Cited

U.S. PATENT DOCUMENTS

| Re. 29,411 | 9/1977 | Newell | 310/49 R |
|---|---|---|---|
| 2,275,827 | 3/1942 | Plensler | 172/36 |
| 3,530,322 | 9/1970 | Newell | 310/82 |
| 4,330,725 | 5/1982 | Hintz | 310/82 |
| 4,360,752 | 11/1982 | Morgan | 310/82 |
| 4,375,602 | 3/1983 | Carlson | 310/83 |
| 4,404,504 | 9/1983 | Giel | 318/269 |
| 4,837,470 | 6/1989 | Tamura | 310/82 |

OTHER PUBLICATIONS

Title page and pp. 7-13 entitled "Valve Operator Assembly" of Navy Manual NAVSEA S9529-AN-M-MA-010 having a publication date of Dec. 15, 1983.

Primary Examiner—Patrick R. Salce
Assistant Examiner—Judson H. Jones
Attorney, Agent, or Firm—L. G. Vande Zande

[57] ABSTRACT

A rotor, rotatably coupled to an output shaft, is slidable axially along the shaft, the rotor and its coupling being biased axially out of engagement with a stator into engagement with a hand wheel to effect rotational coupling of the hand wheel to the output shaft. Electrical energization of the motor attracts the rotor to the stator, axially sliding the rotor and its coupling against the bias to automatically uncouple the rotary connection with the hand wheel, and to effect a motor driven coupling with the output shaft.

8 Claims, 4 Drawing Sheets

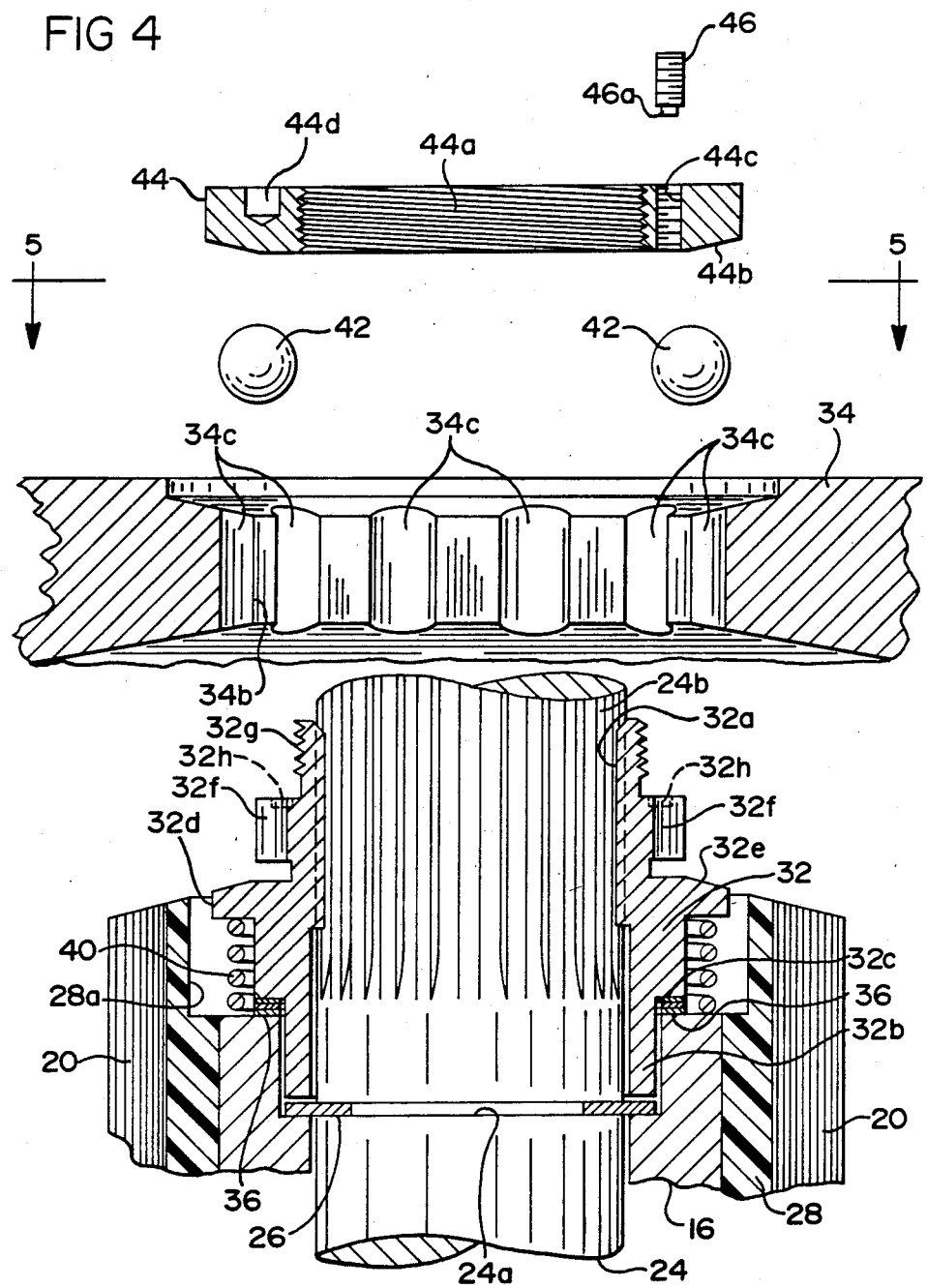

NUTATING MOTOR WITH AUTOMATIC ENGAGEMENT AND DISENGAGEMENT OF HAND WHEEL WITH OUTPUT SHAFT

BACKGROUND OF THE INVENTION

This invention relates to nutating motors wherein the drive or output shaft of the motor is adapted to also be manually driven by a hand wheel. More particularly, the invention relates to nutating motors of the aforementioned type which further include provisions for automatically disengaging the hand wheel from the drive shaft when power is supplied to the motor.

A nutating motor is one which employs a wobbling, or nutating, rotor element. The rotor element is caused to wobble by sequentially energizing appropriate stator windings in the motor. A pair of ring gears having oppositely spaced gear teeth are provided on the wobbling rotor element and on the stator housing. The rotor is made of magnetically permeable material so that the rotating magnetic fields produced by the stator windings cause successive adjacent sectors of the rotor to be pulled toward the successively energized adjacent stator windings and the rotor moves with a wobbling motion about a motor shaft. The rotor element is oftentimes a disc which has an axis extending normally to its face. As the rotor nutates or wobbles, the axis of the rotor describes a conical figure around the axis of the motor output shaft. Relative rotation occurs between the two engaging ring gears on a rotor and on a stator if the engaging ring gears have a different number of teeth. For each nutational cycle of the rotor, the rotor will rotate with respect to the stator an angular distance determined by the difference between the number of gear teeth.

Nutating motors are frequently used to operate large fluid-control valves because such motors provide high torque at low operating speeds. In certain applications, it is desirable to have a redundant manual system for operating the output shaft in the event electrical power is lost. Hand wheels are provided which may be selectively engaged with the output shaft for manual operation. However, it is desirable that the hand wheel be disconnected from the output shaft when the motor is operative. Prior embodiments require a specific operation on the hand wheel or some portion thereof to effect the engagement thereof with the output shaft, such as operating a lever or depressing the hand wheel against the bias of a spring as the hand wheel is rotated.

SUMMARY OF THE INVENTION

This invention provides a nutating motor having a wobbling, or nutating, rotor element of magnetically permeable material carried by a constant velocity coupling rotatably connected to an output shaft of the motor by a splined connection and slidable axially along the splined segment of the shaft, the rotor and coupling being biased axially away from a stator into engagement with a hand wheel, cooperating ring gears on the rotor and stator having a different number of teeth, wherein the rotor and coupling are attracted toward the stator and out of engagement with the hand wheel upon energization of the stator windings, successive energization of adjacent stator windings pulling successive adjacent sectors of the rotor ring gear into engagement with respective sectors of the stator ring gear as the rotor rotates about the output shaft with a wobbling action, imparting rotation to the output shaft.

This invention and its advantages will become more apparent in the following description and claims when read in conjunction with the accompanying drawings.

BRIEF DESCRIPTION OF THE DRAWINGS

FIG. 4 is an exploded cross-sectional view of elements comprising a constant velocity coupling for the rotor, drawn to an enlarged scale.

DETAILED DESCRIPTION OF THE PREFERRED EMBODIMENTS

Figure 1:
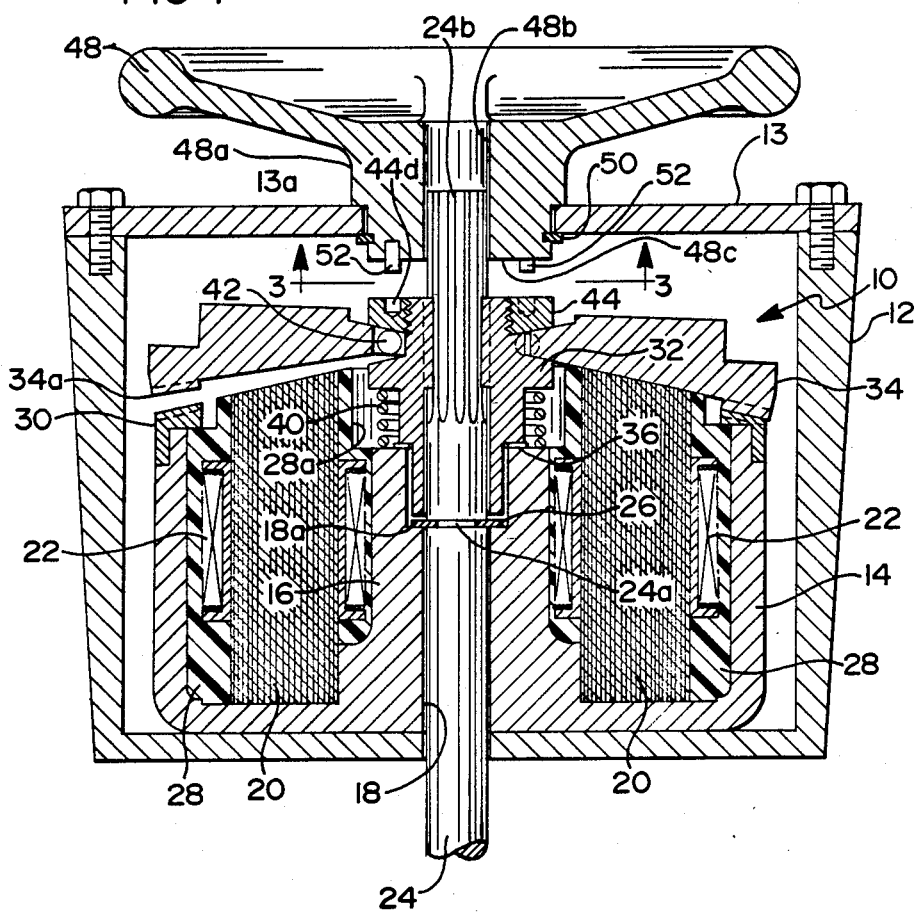
FIG. 1 is a cross-sectional view of a nutating motor having a hand wheel for manual operation of the motor output shaft in accordance with this invention, the motor being shown in an energized condition wherein the hand wheel is disengaged from the output shaft.
Figure 2:
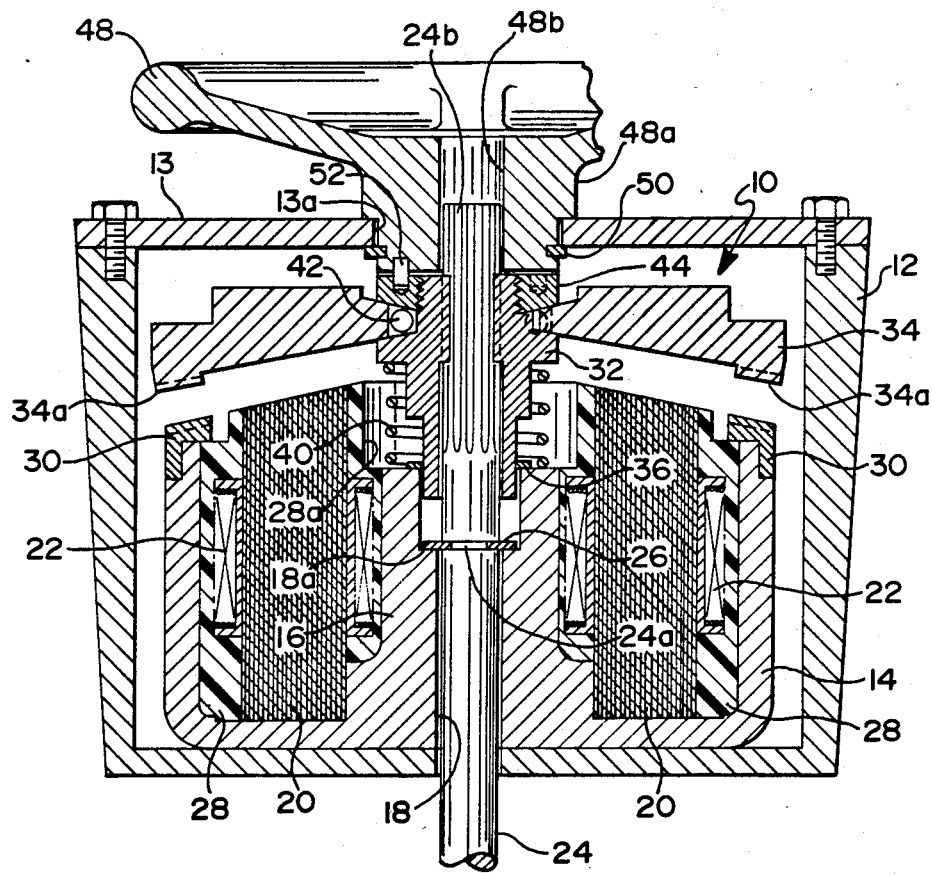
FIG. 2 is a view like FIG. 1 but showing the motor in a deenergized condition and the hand wheel engaged with the output shaft.

FIG. 1 shows a nutating motor assembly 10 disposed within a housing 12. A cup-shaped stator housing 14 includes an upstanding cylindrical center post 16 having a stepped cylindrical bore 18 extending therethrough. A plurality of laminated stator pole pieces 20 are spaced around the interior of housing 14, each stator pole piece 20 having a coil 22 disposed therearound. Stator pole pieces 20 and coils 22 are affixed within cup-shaped housing 14 by a potting material 28, which is molded to provide a coaxial recess 28a adjacent the upper end of center post 16. Although not specifically shown, the coils are electrically connected to means for sequentially energizing the coils in a well known manner. A stator ring gear 30 is affixed at the upper periphery of cup-shaped housing 14.

An output shaft 24 is disposed within the bore 18, the shaft 24 being axially positioned by a C-ring 26, engaged within a circumferential slot 24a in shaft 24, abutting annular shoulder 18a of the stepped cylindrical bore. Where desired, bore 18 may be made oversize and provided with a sleeve bearing for enhancing the rotational support of the output shaft 24.

The upper end of shaft 24 has a straight splined segment 24b formed thereon. Referring also to FIG. 4, a constant velocity coupling 32 having a complementary internal straight tooth spline 32a is disposed over the upper end of shaft 24 for sliding engagement along splined segment 24b. A sleeved lower end 32b of coupling 32 is disposed within the enlarged upper end of bore 18, sleeved end 32b defining an annular shoulder 32c on the coupling 32. Coupling 32 includes a radial flange 32d formed intermediate its ends, the flange 32d having a beveled face 32e formed at the upper side thereof to serve as a thrust spacer for supporting a rotor element 34. Shims 36 are provided around sleeved end 32b of coupling 32 to be disposed between annular shoulder 32c and the upper surface of center post 16 to align the beveled thrust spacer surface 32e with the beveled upper surface of pole pieces 20 and the stator assembly. A helical compression spring 40 is disposed around coupling 32 between the upper surface of center post 16 and flange 32d to bias coupling 32 axially upward along splined segment 24b.

Figure 5:
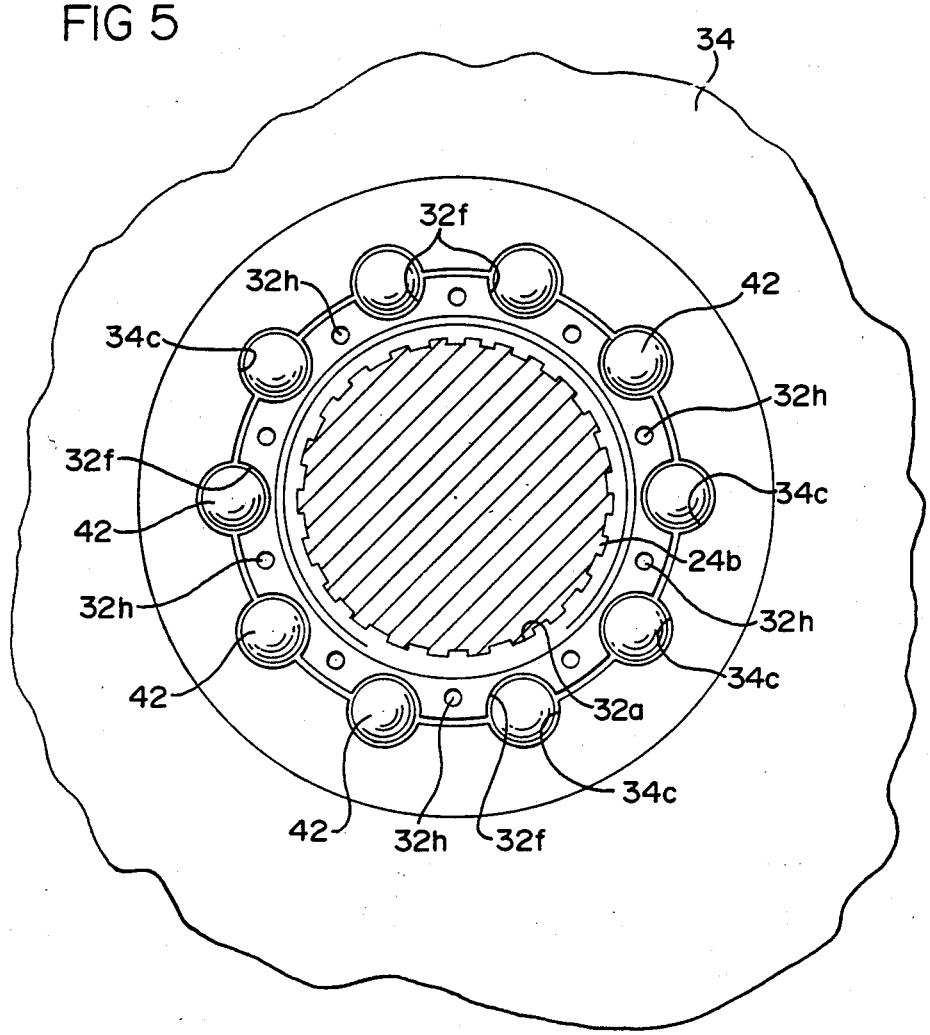
FIG. 5 is a top plan view taken in the direction of the line 5—5 in FIG. 4 showing particular elements of FIG. 4 in an assembled relation.

Rotor element 34 is a beveled disc member formed of magnetically permeable material and has a ring gear 34a formed at its periphery for engagement with stator ring gear 30. Rotor element 34 has a central aperture 34b which is provided with a plurality of axially extending semi-circular slots 34c (see FIGS. 4 and 5). Coupling 32 has a circumferential band of corresponding axially extending semi-circular slots 32f formed integrally thereon immediately above flange 32d. Rotor element 34 is disposed over coupling 32 to rest on the thrust spacer surface 32e. The under surface of rotor element 34 is formed obliquely at a lesser angle than the upper surface of the stator to permit the rotor element 34 to rock into surface-to-surface engagement with the stator. A plurality of ball bearings 42 are disposed in circular pockets defined by radially aligned cooperating semi-cylindrical slots 32f and 34c to rotatably couple rotor element 34 to coupling 32 while at the same time permitting angular wobble of the rotor element 34.

A nut 44 having a threaded central opening 44a is turned upon a threaded end segment 32g of coupling 32 to complete the constant velocity coupling assembly. The under surface of nut 44 has a beveled outer edge 44b to provide a thrust spacer face for the coupling assembly. A plurality of threaded holes 44c extend axially through the peripheral body of nut 44, the holes 44c being equally spaced around the peripheral body. Nut 44 is turned down on coupling 32 until the frustoconical plane of beveled thrust spacer face 44b is essentially complementally coplanar with frustoconical thrust spacer surface 32e and the beveled upper surface of the stator assembly, thereby providing a correct clearance for wobble movement of rotor element 34 with respect to the coupling assembly. When the nut 44 is thus properly adjusted, set screws 46 are threaded through openings 44c wherein reduced diameter ends 46a of the set screws enter respective recess 32h in coupling 32 to prevent rotation of nut 44 on coupling 32 during operation of the motor. Nut 44 is also provided with a plurality of blind recesses 44d equally spaced in the upper surface of the peripheral body of the nut, the recesses 44d disposed between respective holes 44c.

Figure 3:
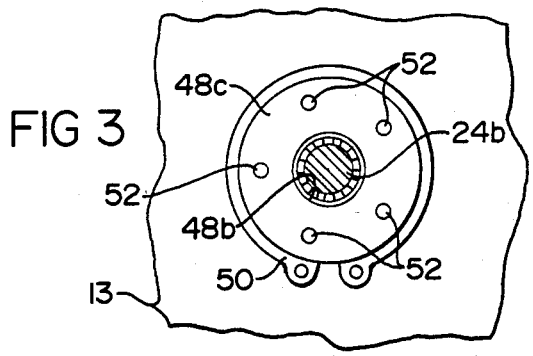
FIG. 3 is a fragmentary cross-sectional view taken along the line 3—3 in FIG. 1 showing an inner end surface of the hand wheel and the output shaft disposed within a clearance opening in the hand wheel.

A hand wheel 48 has a stepped diameter central hub 48a projecting through a central aperture 13a of a top plate 13 of motor housing 12, the aperture 13a being coaxially aligned with output shaft 24. A lock ring 50 is assembled in a circumferential slot in hub 48a at the under side of cover 13 to prevent withdrawal of hand wheel 48 from the aperture 13a of cover 13. Hand wheel 48 is thereby rotatably journaled in cover 13. Various bearing embodiments may be incorporated to enhance the journaling of hand wheel 48 as may be required by specific applications. Hub 48a has a central bore 48b into which the upper end splined segment 24b of shaft 24 projects, the bore 48b providing clearance for free relative rotation between shaft 24 and hand wheel 48. The inner end surface 48c of hub 48a is provided with a plurality of projecting pins 52 press fit into blind holes in hub 48a, in an equally spaced radial pattern as shown in FIG. 3. The number, spacing and arrangement of pins 52 corresponds to the number, spacing and arrangement of recesses 44d so that when the coupling and hand wheel are cooperatively aligned, pins 52 engage within recesses 44d to provide a direct drive rotary connection between hand wheel 48 and output shaft 24. This connection is effected in the deenergized state of nutating motor 10 wherein spring 40 biases rotor element 34 and the coupling assembly axially away from the upper surface of the stator assembly and into engagement with surface 48c of hub 48a. In the event recesses 44d do not initially align with pins 52, the upper surface of nut 44 will abut the ends of pins 52 and the first increment of rotation of hand wheel 48 will bring the pins 52 into registration with recesses 44d whereby spring 40 will drive the coupling and rotor into direct drive engagement with the hand wheel. Thus, in the deenergized condition of the nutating motor 10, hand wheel 48 may be employed to directly operate output shaft 24 of the motor. When power is applied to the motor 10, sequentially magnetizing the respective stator poles 20, rotor element 34 is attracted to the stator assembly, thereby causing the rotor element and coupling assembly to slide axially downward along splined segment 24b of shaft 24, pulling nut 44 and recesses 44d away from pins 52 and consequently automatically disengaging the direct drive rotary connection between the hand wheel and output shaft.

The foregoing describes a preferred embodiment of a nutating motor having a hand wheel for manual operation of the output shaft which is automatically disengaged from the shaft upon electrical operation of the motor, and which engages the shaft automatically upon deenergization of the motor. It should be readily understood that the invention as disclosed herein is susceptible of various modifications without departing from the scope of the appended claims.

I claim:

1. A nutating motor having an output shaft alternatively driven by said motor or by a manually operated wheel comprising:

coupling means mounting a rotor element for wobbling motion about an axis of said shaft, said coupling means rotatably connecting said rotor element to said shaft and being slidable axially along said shaft;

said wheel being rotatable about an axis common with said axis of said shaft and being rotatable independently of said shaft;

cooperative drive means on said wheel and said coupling means engagable in an axial direction to rotatably connect said wheel to said coupling means;

a spring biasing said coupling means axially toward said wheel to effect engagement of said cooperative drive means; and a stator having a plurality of windings energizable in a prescribed sequence to attract said rotor and said coupling means axially away from said wheel against the bias of said spring, disengaging said cooperative drive means, and effecting rotation of said shaft by nutating motion of said rotor element along said stator when said motor is electrically energized.

2. The nutating motor defined in claim 1 wherein said cooperative drive means on said wheel and said coupling means comprises projections on one of said wheel and said coupling means and complementally arranged recesses on another one of said wheel and said coupling means.

3. The nutating motor defined in claim 1 wherein said wheel and said coupling means have respective surfaces disposed transverse to said axis in facing relationship, and said cooperative drive means comprises at least one projection on one of said facing surfaces engagable within a recess on the other of said facing surfaces.

4. The nutating motor defined in claim 1 wherein said coupling means comprises a first member disposed around said output shaft having a first surface supporting said rotor element, and a second element affixed to said first element having a second surface spaced a predetermined distance from said first surface preventing removal of said rotor element and permitting said wobbling motion thereof.

5. The nutating motor defined in claim 4 wherein said shaft comprises a splined segment and said first member comprises a complementally splined aperture disposed over said shaft in axial sliding engagement with said shaft.

6. The nutating motor defined in claim 4 wherein said coupling means first and second members comprise threaded portions cooperatively engaged to affix said second member to said first member.

7. The nutating motor defined in claim 6 wherein said second member comprises at least one set screw engagable with said first member to lock said second member in a predetermined position on said first member.

8. The nutating motor defined in claim 1 wherein said rotor element and said stator each comprise cooperatively disposed ring gears, said ring gears having a different number of teeth, for imparting rotation of said rotor element relative to said stator as a result of said nutating motion.

* * * * *